US008548985B2

(12) United States Patent
Dettinger et al.

(10) Patent No.: US 8,548,985 B2
(45) Date of Patent: Oct. 1, 2013

(54) METHOD AND PROCESS OF QUERY OPTIMIZATION TO A GIVEN ENVIRONMENT VIA SPECIFIC ABSTRACTION LAYER DOMAIN KNOWLEDGE

(75) Inventors: Richard D. Dettinger, Rochester, MN (US); Travis M. Drucker, Rochester, MN (US); Brian R. Muras, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 10/977,765

(22) Filed: Oct. 29, 2004

(65) Prior Publication Data

US 2006/0095440 A1    May 4, 2006

(51) Int. Cl.
*G06F 17/30* (2006.01)

(52) U.S. Cl.
USPC ........... 707/716; 707/718; 707/762; 707/763; 707/769

(58) Field of Classification Search
USPC .......................... 707/716, 718, 762, 763, 769
See application file for complete search history.

(56) References Cited

U.S. PATENT DOCUMENTS

| 5,943,666 | A  | * | 8/1999  | Kleewein et al. ............... 707/2 |
| 6,609,123 | B1 | * | 8/2003  | Cazemier et al. ............... 707/4 |
| 6,725,227 | B1 |   | 4/2004  | Li |
| 6,954,748 | B2 | * | 10/2005 | Dettinger et al. ............... 707/2 |
| 6,996,558 | B2 | * | 2/2006  | Dettinger et al. ............... 707/4 |
| 7,185,016 | B1 | * | 2/2007  | Rasmussen ................... 707/100 |

* cited by examiner

*Primary Examiner* — Debbie Le
(74) *Attorney, Agent, or Firm* — Patterson & Sheridan LLP (57) ABSTRACT

Methods and apparatus for optimizing an abstract query are disclosed. Embodiments of the present invention allow an abstract database to optimize an abstract query composed from a set of logical fields. Each logical field includes a field name and an access method used to map the logical field to an underlying physical representation of the data. After a user composes an abstract query and submits it for execution, a runtime component and optimization component may be configured to resolve the abstract query to a physical query of the underlying physical data source using an access method associated with each logical field. In addition, as the runtime component builds a query consistent with the schema of the underlying database, an optimizing component may modify the query using any suitable optimization techniques. Different optimization techniques include optimizations based on logical field metadata, optimizations based on the underlying physical data repositories referenced by an access method and optimizations based on the relationships between logical fields or underlying data structures.

15 Claims, 8 Drawing Sheets

METHOD AND PROCESS OF QUERY OPTIMIZATION TO A GIVEN ENVIRONMENT VIA SPECIFIC ABSTRACTION LAYER DOMAIN KNOWLEDGE

CROSS REFERENCE TO RELATED APPLICATIONS

This application is related to commonly owned applications "Application Portability and Extensibility Through Database Schema and Query Abstraction," Ser. No. 10/083,075, filed Feb. 26, 2002, now U.S. Pat. No. 6,996,558, and "Remote Data Access and Integration of Distributed Data Sources through Data Schema and Query Abstraction," Ser. No. 10/131,984, filed Apr. 25, 2002, now U.S. Pat. No. 6,954,748, both of which are incorporated by reference herein in their entirety.

BACKGROUND OF THE INVENTION

1. Field of the Invention

The present invention generally relates to computer databases. More specifically, the invention relates to database query optimization techniques.

2. Description of the Related Art

Databases are computerized information storage and retrieval systems. The most prevalent type of database is the relational database, a tabular database in which data is defined so that it can be reorganized and accessed in a number of different ways. A relational database management system (DBMS) uses relational techniques for storing and retrieving data.

Regardless of the architecture, in a DBMS, a requesting entity (e.g., an application, operating system, or end-user) demands access to data stored in a DBMS by issuing a database access request. Such requests may include, for instance, simple catalog lookup requests or transactions and combinations of transactions that read, change and add specified records in the database. Often, these requests are made using formal query languages such as Structured Query Language (SQL). Illustratively, SQL is used to construct a query that retrieves information from and updates information in a database. Commercially available databases include International Business Machines' (IBM) DB2®, MICROSOFT's® SQL SERVER®, and database products from ORACLE®, SYBASE®, and COMPUTER ASSOCIATES®. The term "query" referrers to a set of commands that retrieves, inserts, or modifies data from a database. Queries take the form of a command language that lets programmers and programs select, insert, update, determine the location of data, and the like.

A database schema describes the structure of a database. One of the issues faced by data mining and database query applications, in general, is their close relationship with a given database schema (e.g., a relational database schema describing a set of tables and relationships among tables). This relationship makes it difficult to support an application as changes are made to the corresponding underlying database schema. Further, it inhibits the migration of the application to alternative data representations. In today's environment, the foregoing disadvantages are largely due to the reliance applications have on SQL, which presumes that a relational model is used to represent information being queried. Furthermore, a given SQL query is dependent upon a particular relational schema, because specific database tables, columns and relationships are referenced by an SQL query. As a result of these limitations, a number of difficulties arise.

One difficulty is that changes in the underlying relational data model require changes to the relational schema upon which the corresponding application is built. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements of each relational schema or DBMS system. Yet another difficulty is evolving the application to work with alternate data representations because SQL is specifically designed for use with relational systems. Extending the application to support alternative data representations, such as XMLQuery, requires rewriting the application's data management layer to use non-SQL data access methods.

In addition, as the size and complexity of databases continues to grow, query optimization methods continue to be a critical focus of database operations. Not surprisingly, the state-of-the-art in query optimization is very advanced and requires extensive knowledge of many aspects of both the underlying physical database schema and the particular database engine against which a query will be executed. Such knowledge in the art of query optimization is very valuable to making DBMS systems run efficiently. This is increasingly true as the complexity of database systems grow, especially in emerging fields such as life sciences (e.g., genomic and proteomic fields of study) where the volume of data is immense.

At the same time, however, the increasing complexity of database systems is driving a change in technology that adds to the challenges of query optimization. Specifically, abstraction layers may be used to reduce the complexity faced by a user interacting with a modern database application and DBMS system. Some embodiments of an abstract database provide a data abstraction model, or an abstract data layer, interposed between a user interacting with a query application and an underlying representation used to store data (e.g., a relational database). One embodiment of an abstract data layer provides a set of logical fields that correspond with a users' substantive view of the data. The logical fields are available for a user to compose queries that search, retrieve, add, and modify data stored in the underlying databases. Detailed examples of a data abstraction layer are described in a commonly owned application "Application Portability and Extensibility Through Database Schema and Query Abstraction," Ser. No. 10/083,075, filed Feb. 26, 2002, incorporated herein by reference in its entirety.

One challenge for the database designer where an abstraction layer exists is the ability of the database designer to optimize how an abstract query will be executed, or how to optimize a query of the underlying DBMS system generated from an abstract query. The further the abstraction progresses, the harder it is for a database expert to tune the database, or for the database engine to optimize an individual query, for the most efficient execution. Accordingly, these changes in database design have created a need for techniques that, on one hand, provide users with the ability to compose queries that retain the simple, logical structure provided by a data abstraction model, and that, on the other hand, also provide for query optimization during query processing.

SUMMARY OF THE INVENTION

One embodiment of the invention provides a method for accessing data in an environment of multiple data repositories. The method generally includes providing, for a requesting entity, a data abstraction model comprising a plurality of logical fields for composing abstract queries. The method generally further includes providing, for each of the plurality of logical fields, an access method which specifies at least a method for accessing the data, and, wherein at least one logical field provides query optimization data for optimizing at least one of (i) an abstract query composed using the logical fields of the data abstraction model and (ii) a corresponding resolved query contribution generated from the at least one logical field. In addition to query optimization data, the logical fields may include other metadata.

Another embodiment of the invention provides a method for accessing data in an environment of multiple data repositories. The method generally includes receiving, from a requesting entity, an abstract query composed according to a query specification, wherein the query specification defines a plurality of logical fields used to compose the abstract query, and wherein at least one logical field provides query optimization data for optimizing at least one of (i) an abstract query composed using the logical fields of the data abstraction model and (ii) a corresponding resolved query contribution generated from the abstract query. The method generally further includes transforming the abstract query into a resolved query consistent with a particular physical representation of the data according to an access method provided for each logical field that maps each logical field to the particular physical representation of the data in the multiple data repositories, and optimizing the resolved query consistent with the particular physical representation of the data using the query optimization data provided for the at least one logical field.

Another embodiment of the invention provides a system used to optimize abstract queries. The system generally includes a data abstraction model, configured to provide a set of logical fields used to compose an abstract query, wherein each logical field specifies an access method for accessing a data source associated with the logical field and wherein at least one logical field provides query optimization data for optimizing at least one of an abstract query composed using the logical fields of the data abstraction model and a corresponding resolved query generated from the abstract query. The system generally further includes a runtime component configured to receive the abstract query, and in response, (i) to generate a query contribution for each logical field included in the abstract query, (ii) to merge the query contributions into the resolved query, and (iii) to issue the resolved query to the data source; and an optimization component configured to optimize the query contribution generated for the at least one logical field using the optimization data from the at least one logical field.

Another embodiment of the invention provides a computer-readable medium containing a program which, when executed by a processor, performs operations for providing access to data in an environment of multiple data repositories. The operations generally include receiving, from a requesting entity, an abstract query composed according to a query specification, wherein the query specification provides a definition for a plurality of logical fields used to compose the abstract query and wherein at least one logical field provides query optimization data for optimizing at least one of an abstract query composed using the logical fields defined in the query specification and a corresponding resolved query generated from the abstract query. The operations generally further include transforming the abstract query into a resolved query consistent with a particular physical representation of the data according to an access method provided for each logical field that maps each logical field to the particular representation of the data in the multiple data repositories, and optimizing the resolved query consistent with the particular physical representation of the data representation using the optimization data provided for the at least one logical field.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

Note, however, that the appended drawings illustrate embodiments of the present invention and are not, therefore, to be considered limiting of its scope, for the invention may admit to other equally effective embodiments.

DETAILED DESCRIPTION OF THE PREFERRED EMBODIMENTS

Introduction

Embodiments of the present invention generally provide methods, systems, and articles of manufacture to optimize the execution of abstract queries issued against a data abstraction model. A data abstraction model may provide information about the data that generalized databases are not capable of using or understanding. Because an abstract query is "late-bound" to a resolved query (i.e., a query consistent with a particular physical representation of data) for execution, the opportunity exists for the optimization of resolved query generated from an abstract query. As part of query processing, the optimization data made available in the data abstraction model may be used to optimize a resolved query.

In one embodiment of a data abstraction layer, users may compose an abstract query using a set of logical fields defined by the data abstraction model. The data abstraction model, along with an abstract query interface, provides users with an abstract view of the data available to query (i.e., search, select, and modify). The data itself is stored in a set of underlying physical databases using a concrete physical representation (e.g., a relational database). The physical representation may include a single computer system, or may comprise many such systems accessible over computer networks. Where multiple data sources are provided, each logical field may be configured to include a location specification identifying the location of the data to be accessed. A runtime component is configured to resolve an abstract query into a query processed by the underlying physical data repositories. In one embodiment, the data abstraction layer is further configured to include query optimization data used to optimize the resolved query generated from the abstract one.

Query optimization data may be stored outside the abstract query itself. This allows the underlying physical database environment to change over time and also allows a query to automatically take advantage of the optimizations that are possible based on the underlying DBMS environment. That is, the query optimization process may respond to changes in the underlying databases. Further, this enables the same query, when shared between systems, to be optimized depending on the underlying physical systems, thereby optimizing itself on demand to the particular query environment in which the query is being executed.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the internet and other large computer networks. Such signal-bearing media, when carrying computer-readable instructions that perform methods of the present invention, represent embodiments of the present invention.

In general, software routines implementing embodiments of the invention may be part of an operating system or part of a specific application, component, program, module, object, or sequence of instructions such as a script. The software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art will recognize, however, that any particular nomenclature or specific application that follows is used to facilitate a description of the invention and does not limit the invention for use solely with a specific application or nomenclature. Furthermore, the functionality of programs described herein using discrete modules or components interacting with one another. Those skilled in the art will recognize that different embodiments may combine or merge such components and modules in many different ways.

Further, the following description references embodiments of the invention. The invention is not, however, limited solely to any specifically described embodiment; instead, any combination of the following features and elements, whether related to a particular embodiment described herein, is contemplated to implement and practice the invention. Furthermore, embodiments of the invention provide advantages over the prior art. Although embodiments of the invention may achieve advantages over other possible solutions or over the prior art, whether or not a particular advantage is achieved by a given embodiment is not limiting of the invention. Thus, the following aspects, features, embodiments, and advantages are merely illustrative and neither considered elements nor limitations of the appended claims except where explicitly recited in a specific claim. Similarly, references to "the invention" shall not be construed as a generalization of any inventive subject matter disclosed herein and shall not be considered an element or limitation of the appended claims, except where explicitly recited in a specific claim.

Physical View of Environment

Figure 1:
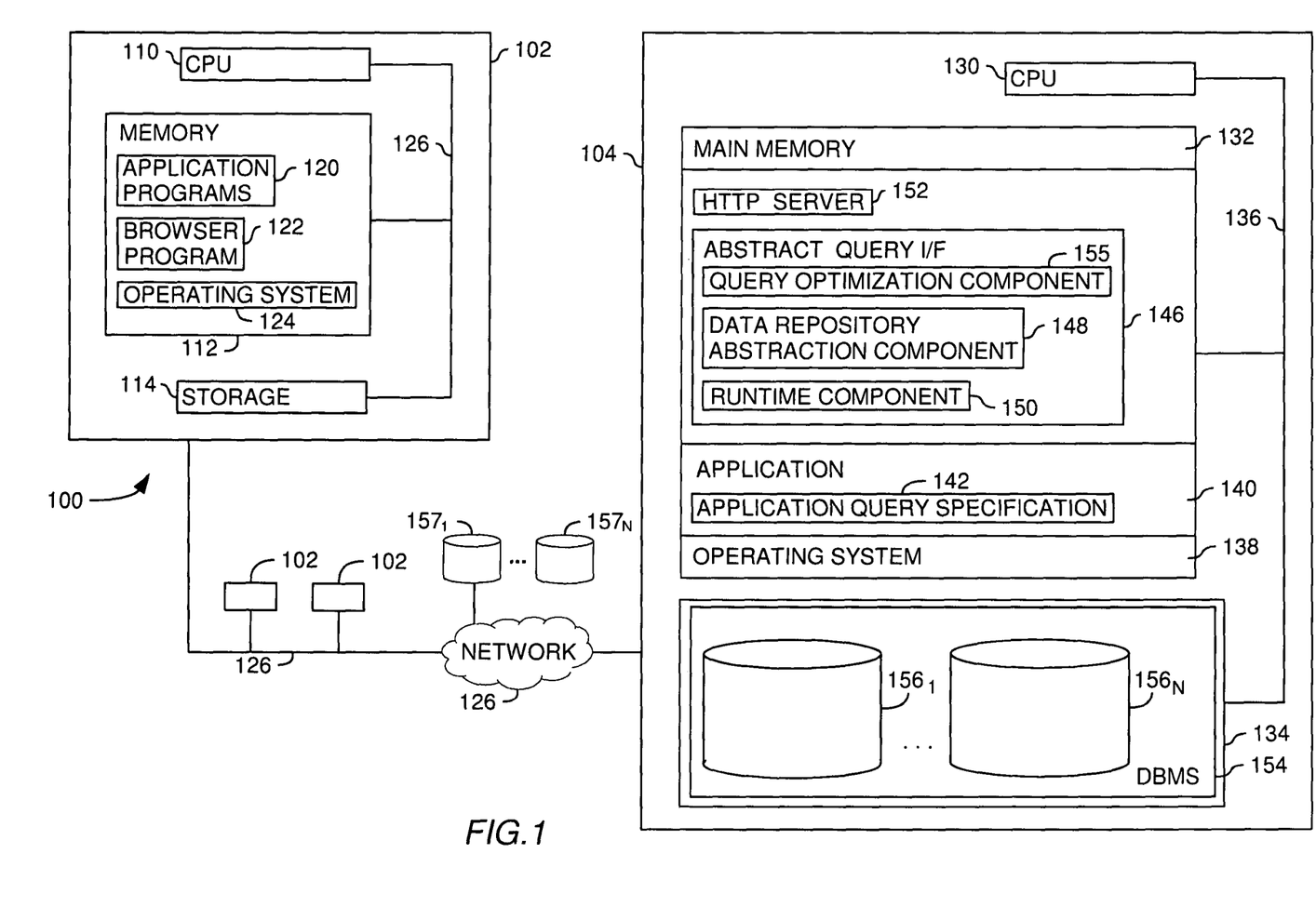
FIG. 1 illustrates a networked computing system according to one embodiment of the invention.

FIG. 1 depicts a block diagram of a networked system 100 in which embodiments of the present invention may be implemented. In general, the networked system 100 includes a client computer 102 (three such client computers 102 are shown) and at least one server 104. The client computer 102 and the server computer 104 are connected via a network 126. The network 126 may be a local area network or wide area network. In one embodiment, computer systems 102 and 104 are connected over the Internet.

The client computer 102 includes a Central Processing Unit (CPU) 110 connected via a bus 126 to memory 112 and storage 114. Storage 114 is preferably a direct access storage device. Typical such devices include IDE, SCSI, or RAID managed hard drive(s). Although shown as a single unit, storage 114 may comprise a combination of fixed and/or removable storage devices, such as fixed disc drives, floppy disc drives, tape drives, removable memory cards, or optical storage. The memory 112 comprises client computer's 102 internal storage areas. Memory 112 includes memory storage devices that come in the form of chips (e.g., SDRAM or DDR memory modules).

In addition, each of the client computers 102 may include additional components not illustrated in FIG. 1, such as I/O devices (e.g., keyboard, mouse pointer, CD-Rom, USB devices), and may also include other specialized hardware. Further, each client computer 102 is running an operating system 124, (e.g., a LINUX® distribution, MICROSOFT WINDOWS®, IBM's AIX®, FREEBSD®, and the like) to manage interactions between hardware components and higher-level software applications.

As illustrated, FIG. 1 shows memory 112 containing a browser program 122 that provides support for navigating between various servers (e.g. server 104) and sharing data between them. In one embodiment, the browser program 122 comprises a web-based Graphical User Interface (GUI), which allows the user to display Hyper Text Markup Language (HTML) documents (i.e., web-pages). More generally, the browser program 122 may be any GUI-based program capable of rendering the information transmitted from the server computer 104. In addition, application programs 120 are illustrated as being resident in memory 112. Application programs 120 may comprise any software program configured to compose, process, and issue abstract queries according to the abstract query specification 142.

The server computer 104 may be physically similar to the client computer 102. Accordingly, the server computer 104 is shown generally comprising a CPU 130, memory 132 and storage device 134, coupled by bus 136. Also, server computer 104, like client computer 102, may include additional components not illustrated in FIG. 1, such as I/O devices (e.g., keyboard, mouse pointer, CD-Rom, USB devices, monitor display and the like), and may also include other specialized hardware. More generally, the client computer 102 and server computer 104 are labeled as such due to their respective function and on the software processes running thereon and not necessarily on any difference in the physical components used to construct each computer system. Server computer 104 is also running an operating system 138, (e.g., a LINUX® distribution, MICROSOFT WINDOWS®, IBM's AIX®, FREEBSD®, and the like) to manage interactions between hardware components and higher-level software applications.

As illustrated in FIG. 1, memory 132 of server computer 104 includes one or more applications 140 and an abstract query interface 146. The applications 140 and the abstract query interface 146 are software products comprising a plurality of instructions that reside in the storage devices in the computer system 104. When read and executed by processor(s) 130 on server 104, the applications 140 cause the server 104 to perform the steps necessary to execute steps or elements embodying the various aspects of the invention. The applications 140 process queries against an abstract database.

An abstract query is resolved into a query consistent with the physical representations used to store data, e.g., data stored in local databases $156_1 \ldots 156_N$, and remote databases $157_1 \ldots 157_N$. (Collectively referred to as databases 156-157.) Illustratively, databases 156 are shown as part of a database management system (DBMS) 154 in storage 134. More generally, as used herein, the terms "databases", "data source" or "data repository" refer to any collection of data regardless of the particular physical representation. For example, databases 156-157 may be organized according to a relational schema (accessible by SQL queries) or according to an XML schema (accessible by XML queries). As used herein, the term "schema" generically refers to a particular arrangement of data. The invention is not limited, however, to a particular database schema and contemplates extension to schemas presently unknown. Accordingly, the data abstraction layer provides access to a set of underlying data repositories that may evolve, in terms of schema, location, accessibility, and the like, over time.

In one embodiment, the queries issued by applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 that transforms the abstract queries into a form consistent with the physical representation of the data contained in one or more of the databases 156-157, and returns results to a requesting entity. The application query specification 142 and the abstract query interface 146 are further described with reference to FIGS. 2A-B.

As illustrated in FIG. 1, abstract query interface 146 may include query optimization component 155 (also referred to as the query optimizer 155) used to optimize the queries generated by runtime component 150. In one embodiment, optimization component 155 comprises a computer program running on server 104. The optimization component 155 is configured to cooperatively interact with runtime component 150. The optimization component 155 is configured to inspect the underlying physical databases (e.g., the specifics of version, product, etc.) and query optimization metadata provided by the data abstraction layer, and to use this information to build the most efficient queries. Although illustrated in FIG. 1 as separate elements, the runtime and optimization components (150 and 155) may be configured as a single program executing on server 104.

In one embodiment, a user interacting with an application program 120 or browser program 122 specifies elements of an abstract query. Such elements may include the fields to search for data, the data to return from the search, and the conditions to search upon. The content rendered by these programs is generated by the application 140. In a particular embodiment, the GUI content is hypertext markup language (HTML) data that may be rendered on the client computer system 102 with the browser program 122. Accordingly, the memory 132 includes a Hypertext Transfer Protocol (HTTP) server process 152 (e.g., a web server such as the open source Apache web-sever program or IBM's WEBSPHERE® program) adapted to service requests from the client computer 102. For example, HTTP daemon 138 may respond to requests to access databases 156, residing on the server 104. Where the remote databases 157 are accessed via the application 140, the data repository abstraction component 148 is configured with a location specification identifying the database containing the data to be retrieved.

Those skilled in the art will recognize that FIG. 1 is merely one hardware and software configuration for the networked client computer 102 and server computer 104, and that embodiments of the present invention can apply to any comparable hardware configuration, regardless of whether the computer systems are complicated, multi-CPU computing systems, single-user workstations, or network appliances without non-volatile storage of their own. Additionally, it is understood that where reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the HTTP server process 152 shown in FIG. 1 is merely illustrative, and other embodiments adapted to support any known and unknown protocols for data communications between computer systems are contemplated.

Logical/Runtime View of Environment

Figure 2A:
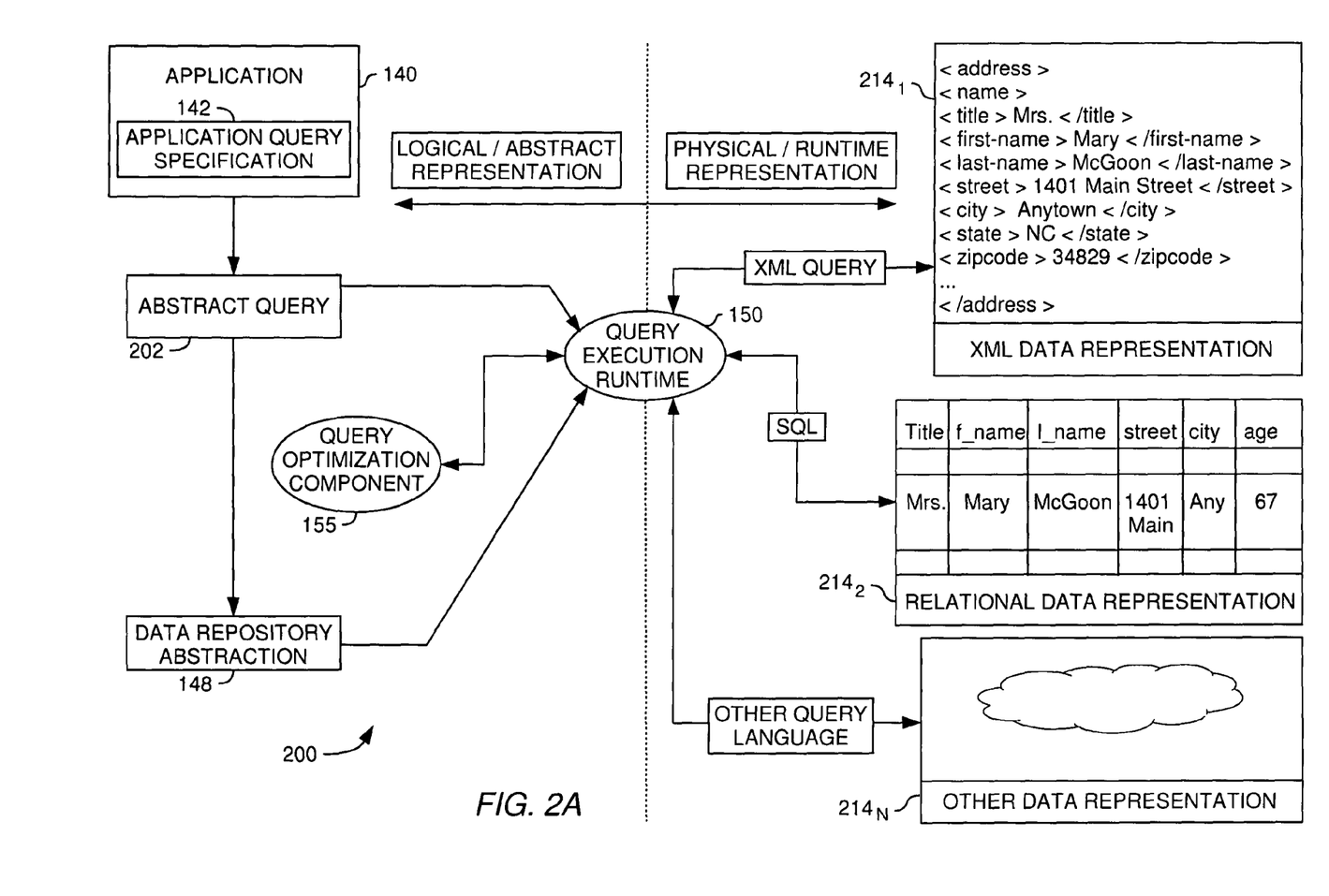
FIG. 2A is an illustrative relational view of software components.
Figure 2B:
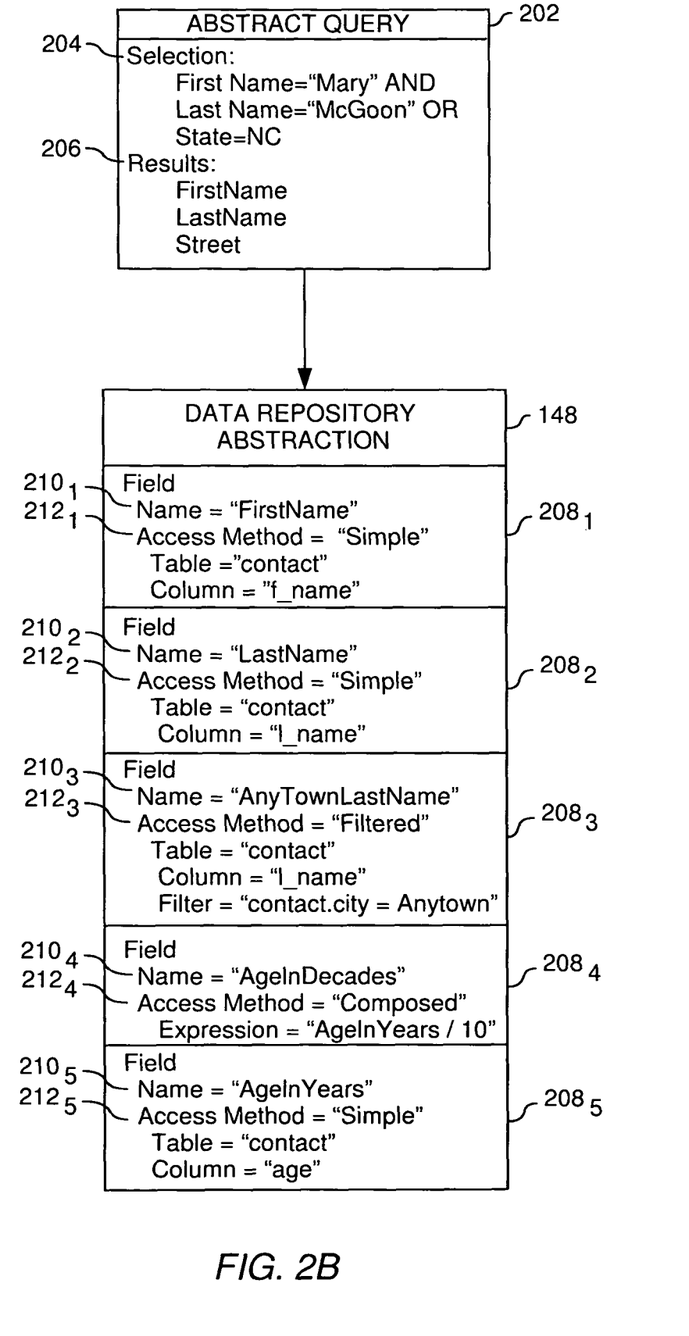
FIG. 2B illustrates an abstract query and corresponding data repository abstraction component, according to one embodiment of the invention.

FIGS. 2A-B illustrate a plurality of interrelated components 200 of the invention. The requesting entity composes an abstract query 202 according to a respective application query specification 142. The resulting abstract query 202 is generally referred to herein as an "abstract query" because it is composed using the abstract (i.e., logical) fields provided by the data abstraction model rather than by direct reference to the underlying schemas of databases 156-157. As a result, abstract queries may be defined that are independent of the particular underlying data representations (e.g., a relational database and SQL schema). The application query specification 142 may define both the criteria available for data selection (selection criteria 204) and the fields that may be returned to a user (return data specification 206) based on the selection criteria 204.

The logical fields specified by the application query specification 142, and used to compose the abstract query 202, are defined by the data repository abstraction component 148. The application query specification 142 may define both the criteria available for data selection (selection criteria 204) and the fields that may be returned to a user (return data specification 206) based on the selection criteria 204.

In addition, each logical field may include optimization data. Optimization data may be related to the substantive data stored in a database, relationships among logical fields in the data repository abstraction component, or the underlying database schema. Once a user composes an abstract query and provides it to the system for processing, the runtime component 150 resolves the abstract query into a query that may be issued against the underlying physical databases 156-157 (e.g., an SQL query of a relational database). Additionally, query optimization component 155 may optimize an abstract query using any appropriate optimization technique. Several illustrative optimization techniques are described in detail below.

Referring to FIG. 2B, in one embodiment, the data repository abstraction component 148 comprises a plurality of logical field specifications $208_{1-5}$ (five shown by way of example), collectively referred to as logical field specifications 208. Specifically, a field specification is provided for each logical field available to include as part of an abstract query. In one embodiment, each field specification 208 comprises a logical field name $210_{1-5}$ (collectively, field name 210) and an associated access method $212_{1-5}$ (collectively, access method 212). The access methods associate (i.e., map) the logical field names to a particular physical data representation $214_1$, $214_{2-N}$ in a database (e.g., one of the databases 156). By way of illustration, two data representations are shown, including an XML data representation $214_1$ and a relational data representation $214_2$. However, the physical data representation $214_N$ indicates that any other data representation, known or unknown, is contemplated.

Depending upon the number of different logical fields supported by the data abstraction layer, any number of access methods is contemplated. For example, one embodiment provides access methods for simple fields, filtered fields, and composed fields. The field specifications $208_1$, $208_2$ and $208_5$ exemplify simple field access methods $212_1$, $212_2$, and $212_5$, respectively. Simple fields map directly to a particular entity in the underlying physical data representation (e.g., a simple field may map to a table and column of a relational database). Illustratively, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field "AnytownLastName" to a physical entity in a column named "l_name" in a table named "contact" and defines a filter for individuals in the city of Anytown. Another example of a filtered field is a New York ZIP code logical field that maps to a physical representation of ZIP codes and restricts the data only to those ZIP codes defined for the state of New York.

Field specification $208_4$ exemplifies a composed field access method $212_4$. Composed access methods compute a value from one or more fields (either abstract fields or data from a database) using an expression supplied as part of the access method definition. In this way, information that does not exist in the underlying database may be computed. In the example illustrated in FIG. 2B, the composed field access method $212_4$ maps the logical field name $210_4$ "AgeInDecades" to "AgeInYears/10". Other illustrative examples of a composed field includes is a sales tax field that is composed by multiplying a sales price field by a sales tax rate or a name composed by concatenating individual first name and last name fields described above.

It is contemplated that the formats for any given data type (e.g., dates, decimal numbers, etc.) of the underlying data may vary. Accordingly, in one embodiment, the field specifications 208 include a type attribute that reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, field specifications 208 of data repository abstraction component 148 shown in FIG. 2 are representative of logical fields mapped to data represented in the relational data representation $214_2$. However, other instances of the data repository abstraction component 148 map logical fields to other physical data representations, such as XML. An illustrative abstract query corresponding to the abstract query 202 shown in FIG. 2 is shown in Table I below. By way of illustration, the data repository abstraction 148 is defined using XML. However, any other language may be used to advantage.

TABLE I

| Query Example |
|---|
| 001 <?xml version="1.0"?> |
| 002 <!--Query string representation: (FirstName = "Mary" AND LastName = |
| 003 "McGoon") OR State = "NC"--> |
| 004 <QueryAbstraction> |
| 005   <Selection> |
| 006     <Condition internalID="4"> |
| 007       <Condition field="FirstName" operator="EQ" value="Mary" |
| 008 internalID="1"/> |
| 009       <Condition field="LastName" operator="EQ" value= "McGoon" |
| 010 internalID="3" relOperator="AND"></Condition> |
| 011     </Condition> |
| 012     <Condition field="State" operator="EQ" value="NC" internalID="2" |
| 013 relOperator="OR"></Condition> |
| 014   </Selection> |
| 015   <Results> |
| 016     <Field name="FirstName"/> |
| 017     <Field name="LastName"/> |
| 018     <Field name="Street"/> |
| 019   </Results> |
| 020 </QueryAbstraction> |

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may include a field name and sort criteria.

Figure 3:
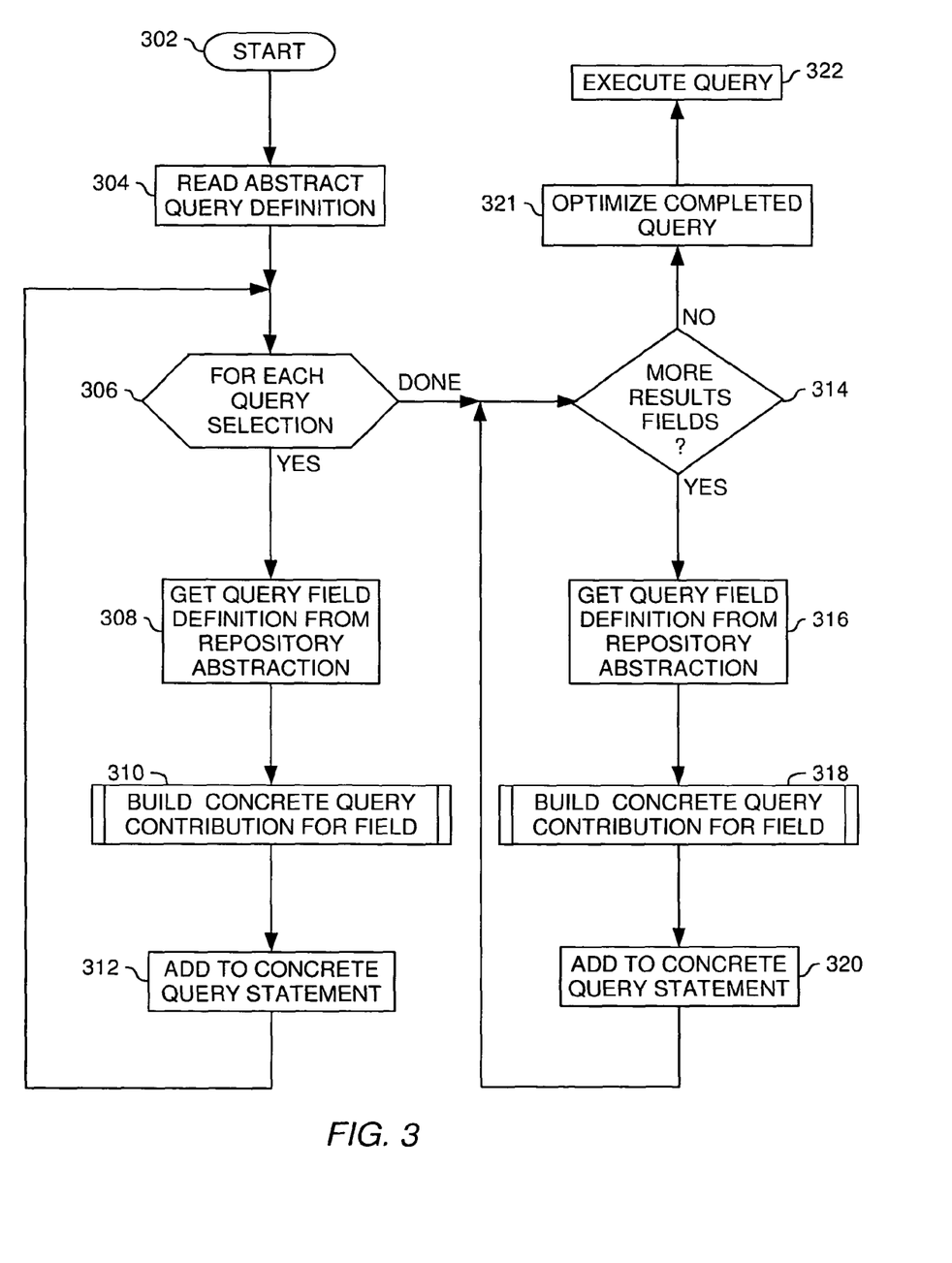
FIG. 3 is a flow chart illustrating the operation of a runtime component and an optimization component, according to one embodiment of the invention.

FIG. 3 illustrates an exemplary runtime method 300 of the operation of runtime component 150, according to one embodiment of the invention. The method 300 is entered at step 302 when the runtime component 150 receives as input an instance of an abstract query (such as the abstract query 202 shown in FIG. 2). At step 304, the runtime component 150 parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a resolved query. In one embodiment, a selection criterion consists of a field name (for a logical field), a comparison operator (=, >, <, etc.) and a value expression (i.e., what is the field being compared to). At step 308, the runtime component 150 uses the field name from a selection criterion of the abstract query to look up the definition of the field in the data repository abstraction 148.

As noted above, the field definition includes a definition of the access method used to access the physical data associated with the field. The runtime component 150 then builds (step 310) a query contribution for the logical field being processed. As defined herein, a query contribution is a portion of a resolved query that is used to perform data selection based on the current logical field. A resolved query is a query represented in languages like SQL and XML Query and is consistent with the data of a given physical data repository (e.g., a relational database or XML repository). The resolved query is used to locate and retrieve data from a physical data repository, represented by the databases 156-157 shown in FIG. 1. The resolved query contribution generated for the current field is then added to a resolved query statement. Accordingly, the resolved query statement is composed from the individual contributions. The resolved query statement may be a composite of all the query contributions executed against an underlying DBMS as a single query, or may also be multiple, discrete queries. The method 300 then returns to step 306 to begin processing for the next field of the abstract query. Accordingly, the process entered at step 306 is iterated for each data selection field in the abstract query.

After building the data selection portion of the resolved query, the runtime component 150 identifies the information specified in the abstract query to be returned as a result of query execution. The abstract query may provide a plurality of logical fields that are to be returned as a result of query execution, referred to herein as a result specification. A result specification in the abstract query may include a field name and sort criteria. Accordingly, the method 300 enters a loop at step 314 (defined by steps 314, 316, 318 and 320) to add result field definitions to the resolved query statement generated. At step 316, the runtime component 150 retrieves a result field name (from the result specification of the abstract query) in the data repository abstraction 148 and a result field definition from the data repository abstraction 148 to identify the physical location of data to be returned. The runtime component 150 then builds (at step 318) a resolved query contribution for the logical field included in the results criteria of the abstract query. At step 320, the query contribution is added to the resolved query statement.

In one embodiment, the resolved query statement may comprise multiple queries. For example, where multiple data repositories are included in the data abstraction model, the runtime component may generate separate queries for each underlying physical data repository as necessary to process and execute an abstract query. In such an embodiment, the runtime component 150 issues the multiple queries and merges the results. Additionally, whether the runtime component generates one or more resolved queries while processing an abstract query, an optimization component 155 may be used to modify the resolved queries prior to execution on the underlying DBMS system or systems.

After the run time component 150 builds query contributions for the selection and results fields, optimization component 155 may modify the query using any appropriate optimization technique. In addition, query optimization component 155 may modify each query contribution generated at steps 310 and 318. Thus, query optimization may occur on two levels. First, each logical field may include optimization data used to optimize each individual query contribution. Once the resolved query statement is generated, it may again be optimized across the contributions. Once each of the fields in the abstract query has been processed and any optimizations to the query have been made, the query is executed at step 322.

One embodiment of a method 400 for building and optimizing resolved query contributions for a logical field according to steps 310 and 318 is described with reference to FIG. 4. At step 402, the method 400 queries whether the access method associated with the current logical field is a simple access method. If so, the resolved query contribution is built (step 404) based on physical data location information and optimized (step 405). Processing then continues according to method 300 described above. Otherwise, processing continues to step 406 to query whether the access method associated with the current logical field is a filtered access method. If so, a resolved query contribution is built (step 408) based on physical data location information for some physical data entity. At step 410, the resolved query contribution is extended with additional logic (filter selection) used to subset data associated with the physical data entity. The query contribution, with the filter selection, is optimized at step 411. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the concrete query contribution is generated. Processing then continues according to method 300 described above. The query contribution generated for the logical field is optimized at step 417. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

For some logical fields, conditions, or return values, it may be necessary to perform a data conversion if a logical field specifies a data format different from the underlying physical data. In one embodiment, an initial conversion is performed for each respective access method when building a concrete query contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

One embodiment extends the data repository abstraction component 148 to include description of a multiplicity of data sources that can be local and/or distributed across a network environment. The data sources may use a multitude of different data representations and data access techniques. In one embodiment, this is accomplished by configuring the access methods of the data repository abstraction component 148 with a location specification that identifies (for at least one logical field) a remote location where the data associated with the logical field resides. Additional examples of such embodiments are described in a commonly owned, currently pending application, "Remote Data Access and Integration of Distributed Data Sources through Data Schema and Query Abstraction," Ser. No. 10/131,984, filed Apr. 25, 2002, incorporated in entirety by reference.

Abstract Query Optimization Techniques

This description has, thus far, described the data repository abstraction component 148 that provides a logical view of the data and exemplary methods for the runtime component 150 to resolve an abstract query into a query executed against underlying physical databases 156-157. Additionally, as described above, while processing abstract queries, the runtime component 150 and optimization component 155 interact to optimize the query ultimately executed against databases 156-157. FIGS. 5-8 illustrate a number of specific query optimization techniques that the runtime component 150 and optimization component 155 may employ to optimize a physical query generated from an abstract query.

Row Optimization

Figure 5A:
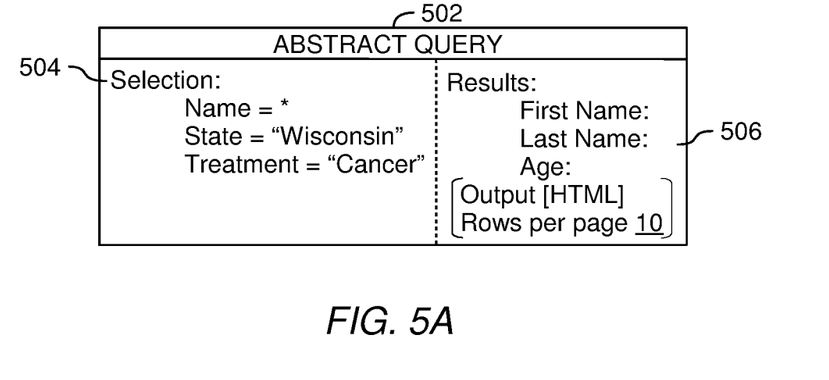
FIG. 5A shows an illustrative abstract query.

FIG. 5A illustrates an abstract query 502 that the optimizing component 155 may optimize based on the number of rows that the query anticipates to be returned. Row optimization is a technique used to optimize an SQL query, and a particular SQL query may be optimized for 1, N, or ALL rows. In optimizing an SQL query, however, a traditional SQL query optimizer is typically unable to determine how many rows to optimize for from the query itself; rather, this information must be supplied. In one embodiment, logical field specifications may be extended to include row optimization data.

As illustrated, FIG. 5A includes an abstract query 502 composed using the selection fields 504 that include "State=Wisconsin" and "Treatment=Cancer". In addition, result fields 508 include a "first name", "last name", and "age" as output conditions for example query 502. As illustrated, the abstract query includes output conditions 606 that include an output format "HTML" and a "rows per page" setting of 10.

In one embodiment, a user composes queries (e.g. such as abstract query 502) using a web-based interface that includes a web-browser 122 communicating with http server 152. The HTML rendered by browser program 122 may be configured to display a representation of abstract query interface 146, thereby allowing the user to compose an abstract query using logical fields 208. The output settings 506 may not be part of each individual query; rather, they may be settings associated with the abstract query interface 146. Either way, the optimization component 155 may use the display settings (or other relevant configuration data) to make an inference about the expected results data. For example, with a setting of HTML, and a "rows per page" setting of "10", it is unlikely that the user is expecting (or interested in) hundreds of rows of results, and the optimization component 155 can modify the resolved query contributions accordingly.

Figure 5B:
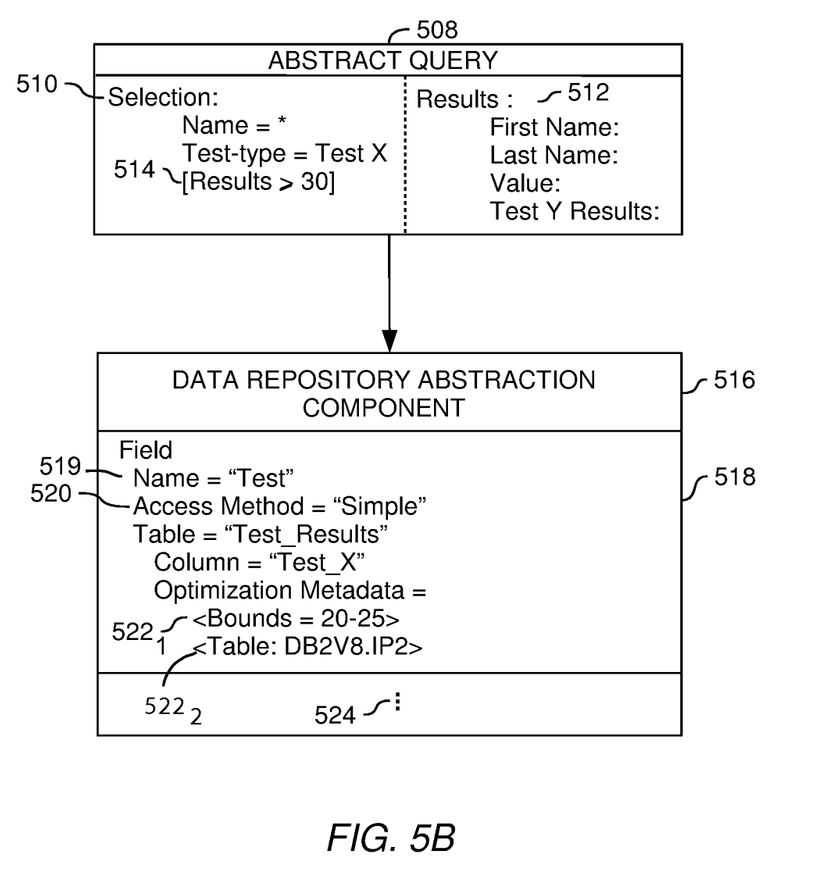
FIG. 5B illustrates an abstract query and a corresponding data repository abstraction component, according to one embodiment of the invention.

In one embodiment, the logical field specification 208 for a logical field may be extended to include row optimization metadata. FIG. 5B illustrates another example of an abstract query 508. In this example, the logical field 518 of data repository abstraction component 516 is included in abstract query 508. Abstract query 508 includes selection criteria 510 and result fields 512. As illustrated, the selection criteria include a conditional test 514 that restricts the values returned for the example logical field. The abstract query 508 returns the names of individuals who have taken Test_Y and the value for Test_Y, but the selection criteria limits the results to individuals who have also taken Test_X with a result value greater than 30. Scientific researchers may use queries like abstract query 508 to seek out correlative relationships between different test procedures or medical conditions within a given cohort of individuals.

The logical field 518 includes field name 519 and access method 520. In this example, the logical field 518 is extended to include optimization metadata $522_1$ used by the optimization component 155 to optimize the query contribution generated for logical field 518 (e.g., as part of steps 310 or 318 of operations 300) or overall query optimization (e.g., as part of step 321 of operations 300). The bounds attribute $522_1$ may be used to provide specific attributes about field 518 to the query optimizer 155 regardless of the underlying access method. For example, the bounds $522_1$ may represent the expected value ranges for "Test_X" that would be expected for "healthy" people to whom "Test_X" is administered. These values may be used to estimate the number of rows that the query will return, given the condition. Accordingly, the condition "results≥30" may indicate to the optimizing component 155 that a low number of results are expected because of the conditional value. The optimizing component 155 may use the expected number of rows to select among different possible join orders used for a resolved query contribution accessing the data of a relational table. An SQL query optimizer is unable to perform this optimization without the bounds metadata $522_1$ provided by the logical field specification.

Apart from the query specific optimization used by bounds conditions $522_1$, optimization metadata $522_2$ may also provide system specific information associated with a particular access method. This information may include specifics of version, product, or schema relevant to query optimization. Because the same logical field may be used by different parties, the underlying physical mechanism used to store the same data may be may be different. Thus, the query optimization component 155 may be used to optimize the logical field depending on the environment actually used by different parties.

Another row optimization technique involves "test fields" (e.g., logical field 518). A common relational database structure is to store test results for many different types of test in a single table with a column to indicate different test types. Test fields included in abstract queries typically generate derived tables during query processing. This is so because test fields typically retrieve values for a particular test from a table that contains values for many tests. Derived tables present another abstract layer optimization that the optimization technique component 155 may be configured to employ. As those skilled in the art will recognize, in SQL, a derived table is a select statement inside parenthesis, with an alias, used as a table in a join. The runtime component 150 may generate a query contribution from a test field that includes several derived tables within a single SQL query. For example, the following SQL statement includes a derived table.

select* from X join (select* from y join Z where Y.criteria and Z.criteria) where X.criteria.

When an SQL query includes a derived table, the traditional SQL query optimizer will often attempt to merge this derived table with the higher layer SQL. In other words, an SQL optimizer may seek to unpack the embedded derived table into a single query. Thus, an SQL query optimizer might rewrite the above SQL statement as:

select* from X join Y join Z where Y.criteria and Z.criteria and X.criteria.

The optimizer chooses this optimization because in almost all cases, using a single "select" statement provides superior performance. In some cases, however, where the derived table is very sparse (i.e., the query selects only a handful of records are selected out of a large number of potential rows) the original query may be more efficient if the derived table is materialized (i.e., the sub query select statement is not unpacked). In such a case, the query optimizer 155 can compare data from the field optimization metadata 522 and the result condition 514 and determine that only a few records are likely to be selected from the derived table, and accordingly, not modify the query to avoid the derived table materialization.

Field Correlations

Figure 6:
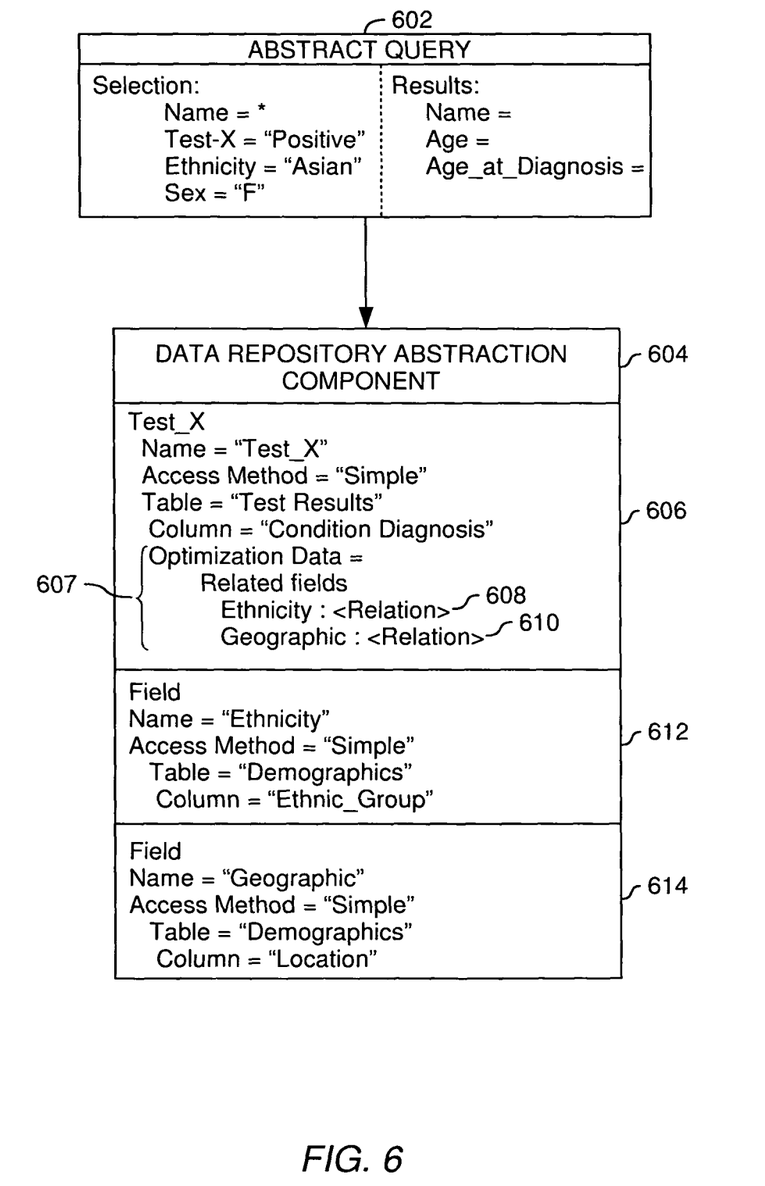
FIG. 6 illustrates an abstract query and a corresponding data repository abstraction component, according to one embodiment of the invention.

In one embodiment, the query optimizer 155 may be configured to optimize a query using correlations among logical fields. Logical field specification 208 may include optimization data that indicates how different fields are related to one another. For example, FIG. 6 illustrates an abstract query 602 and a corresponding data repository abstraction component 604. As illustrated, abstract query 602 retrieves the "name", "age", and "age when diagnosed" of individuals diagnosed with a particular condition who are also Asian females. Oftentimes, in medical research, different geographic or ethic groups are more or less susceptible to different conditions. FIG. 6 illustrates an extended logical field definition 606 for the "test_x" logical field to reflect this metadata about the condition corresponding to "test_x". Specifically, optimization data 607 includes an indication of related fields. In this case, an ethnicity relation 608 for logical field 612 and a geographic relation 610 for the geographic logical field 614 are provided.

The optimization component 155 may rely on the field relationship optimization data, and the content of a particular abstract query, to optimize the resolved query contribution generated for a logical field. For example, if diagnosis X occurs predominantly in white males and only in 5% of Asian females, the optimization component 155 may be able to optimize abstract query 602 to expect a small set of result data. Another query (e.g., one seeking all white males with diagnosis X) may be optimized for a large set of result data. Thus, embodiments of the present invention may optimize abstract queries, and the resolved query contributions generated therefrom, individually, depending on query content and the relationship among the fields included in a particular abstract query.

Field Relevance Information

Another optimization technique relies on field relevance and statistical values. In an embodiment where multiple institutions are capable of interacting with data from an abstract database, a large data repository abstraction component may include thousands of fields, with access methods that map the fields to multiple, disparate physical data sources. A particular institution, however, may specialize and rely on a relatively small number of logical fields. The query optimization component 155 may be configured to optimize queries according to patterns associated with different groups of users. Additionally, the data abstraction model may specify statistical information that may be used to influence query processing order where there is a large disparity between the magnitudes of different sets of data.

Consider, for example, a relational database with a "patients" table that includes rows of data related to five-million individuals. Such a table should include a roughly equal distribution of males and females. Second, consider a Lab Data table with 800 Million rows of data related to 5000 different medical tests. A data repository abstraction component may be constructed to include fields for patient data, as well as multiple fields for the different tests. As an example, an abstract query composed to retrieve data from these tables might retrieve all males who have been administered RareTestX and have a result greater than 200, such as follows:

Abstract Query: Males with (RareTestX>200)

Figure 7:
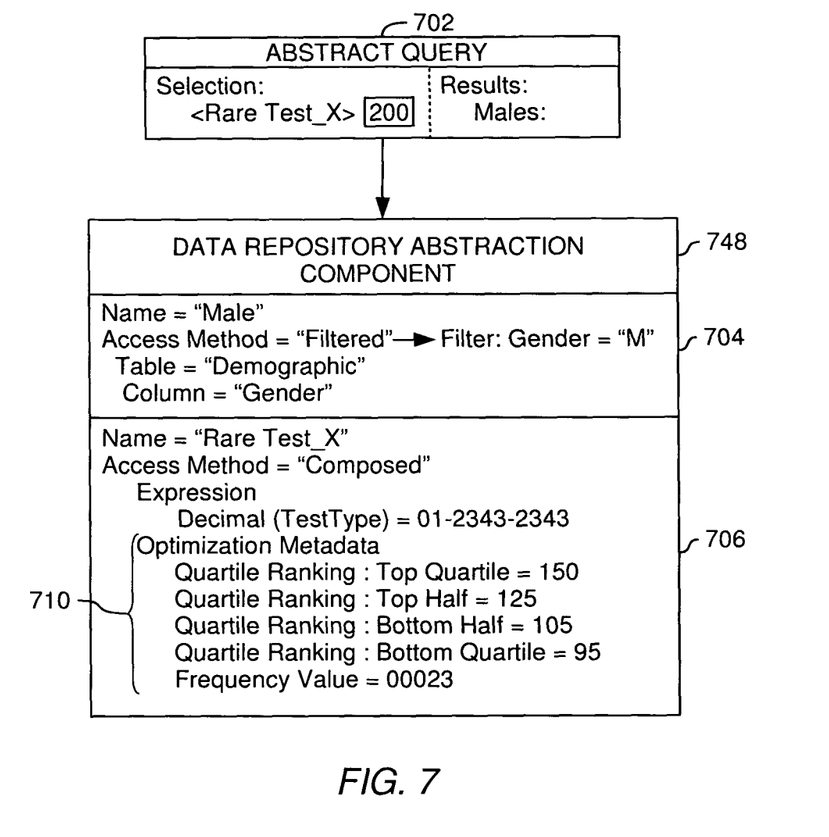
FIG. 7 illustrates another example abstract query and a corresponding data repository abstraction component, according to one embodiment of the invention.

FIG. 7 illustrates this abstract query 702 and a data repository abstraction component 748 corresponding to a "gender" logical field 704 and a RareTestX logical field 706. With the appropriate optimization metadata (e.g., metadata 710), abstract query 702 may be optimized in a number of ways:

start with Males because it is the smaller table start with Males because its known that there are only two values in the gender field (i.e., M or F)

start with the RareTestX condition because its only 1 of 5000 values Which optimization is preferred, however, may depend on information not directly available from the underlying DBMS system. For example, the optimization metadata may provide specific expected ranges of values, statistical distributions, and the like. Again, many other optimizations are possible depending on the abstraction created by the logical field, the actual underlying architecture of the physical data repositories and the nature of the data being represented. Illustratively, two types of this type of optimization metadata include rankings and frequency data:

Rankings: provide values for what the quartiles are for test results. This is useful for knowing that a request for a value of 200 is going to be likely to be exceedingly rare in most database entries.

Frequency: this is a model by which a value can be associated with how commonly the test is done on patients. For example, the frequency value in Table IV listed below should be very rare based on value of 0.00023.

When all test values are stored in one table, or one view created from disparate tables, this type of field relevance information cannot be determined directly from the underlying physical data source. Finding the value for a specific test involves finding data that satisfies the predicate: ("where test =testType and value =searchValue"). Because all the values for all the tests are in one database table (or one view), the database alone is incapable of determining how likely it is that the actual value used in the condition (e.g., >200) will occur. For many tests, "200" will be a low value. For many other tests, it will be very high or even invalid. The following table illustrates the logical field specification which includes field relevance information for the RareTestX logical field 706 described above using the rankings and frequency relevance optimization metadata.

TABLE II

Rare Test Logical Field

```
001  <Field name="Rare Text X">
002    <AccessMethod>
003      <Composed>
004        <Composition>DECIMAL(<FieldRef
005          name="data://Internal/TestValue"/>
006        </Composition>
007          <Where>
008            <Condition field="data://Internal/TestType" operator="EQ">
009              <Value val="01-2343-2343"/>
010            </Condition>
011          </Where>
012      </Composed>
013      <optimizationMetaData>
014        <ranking name="topQuartile" value="150" />
015        <ranking quartile="topHalf" value="125" />
016        <ranking quartile="bottomHalf" value="105" />
017        <ranking quartile="bottomQuartile" value="95" />
018        <frequency value="0.00023" />
019      </optimizationMetaData>
020    </AccessMethod>
021    <Type baseType="float">
022      <Range minValue="0.0" maxValue="150.0" />
023    </Type>
024    <Description>Rare Test data</Description>
025  </Field>
```

TABLE III

Data Repository Abstraction Example

```
001  <Field name="Full Phone Number">
002    <AccessMethod = "Composed">
003      <Composition>
004        <FieldRef name="data://Demog/Phone Area Code"/> || ' ' ||
005        <FieldRef name="data://Demog/Phone Exchange"/> || '-' ||
006        <FieldRef name="data://Demog/Phone Number"/>
007      </Composition>
008        <optimizationMetaDatatype="conditionRewrite"
009          method="com.ibm.ddqb.PhoneConditionRewriter">
010          <mapping name="data://Demog/Phone Area Code"
                     mappingTable = "
011          state Area code Map Table" mappingFrom="data://Demog/Phone
                     Area
012          Code" mappingTo="data://Demog/State" />
013          <mapping name="data://Demog/Phone Area Code"
014            typeMapField="data://Demog/integerAreaCode"
                     dataType="integer" /
015        </optimizationMetaData>
016      </AccessMethod>
017    <Type baseType="char" />
018    <Description>Textual phone number</Description>
019  </Field>
```

Lines 013-19 illustrate the optimization metadata for frequency and rankings (i.e., optimization metadata 710) as described above. The optimization component 155 may compare the frequency and rankings values with the conditions specified for a particular abstract query to select an optimization technique to apply to the abstract query.

Composed Field Optimization

Figure 8:
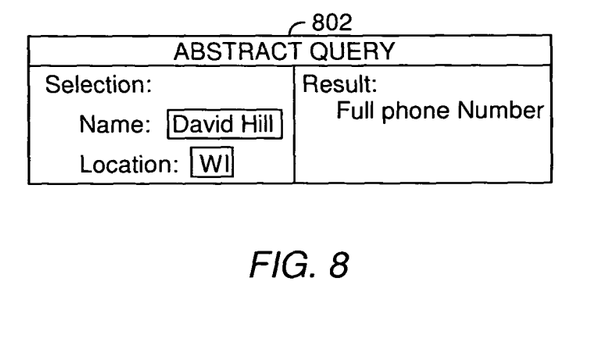
FIG. 8 illustrates another example abstract query, according to one embodiment of the invention.

Another abstract query optimization technique optimizes the query contribution generated for a composed field. As described above, composed fields may combine data from multiple logical fields, or data repositories, according to a composition expression. Composed logical fields present many opportunities for query optimization. Table III, below, illustrates a composed logical field to illustrate several possible types of optimization metadata useful for a composed field. For example, the optimization component 155 may modify a query contribution generated from a logical field that retrieves a particular telephone number composed from an area code component, a prefix component and a suffix component. The optimization component 155 may limit the number of database records searched by the query by adding a selection criteria based on portions of the existing selection criteria. Thus, while the user only composes a query to search for "608 253-7364", for example, the query optimizer builds a resolved query to search against the correct conditions, e.g., simple integer fields used to store a telephone number. Another abstract query optimization related to this comprises configuring the optimization component 155 to add selection criteria such as "state =Wisconsin" to an abstract query. (NB: the 608 area code is assigned to the southern part of Wisconsin). This query optimization would cause the runtime component 150 to generate a query that world first screen out any records in which state field was not "Wisconsin", thus presenting a smaller set of records to compare for the target phone number. This latter technique involves optimizing one part of the composition using data from another. FIG. 8 illustrates an example of such an abstract query 802. Illustratively, abstract query 802 is configured with selection criteria to retrieve a telephone for an individual residing in Wisconsin.

The full telephone number logical field above describes a case where data from multiple underlying columns of a relational DBMS system is retrieved and joined together. Suppose that a phone number is being represented by three simple fields within the database, each used to store an integer value (lines 004-006). In such a case, the structure of the underlying physical representation may be included as part of an optimization metadata tag within the logical field specification for the phone number logical field.

Figure 4:
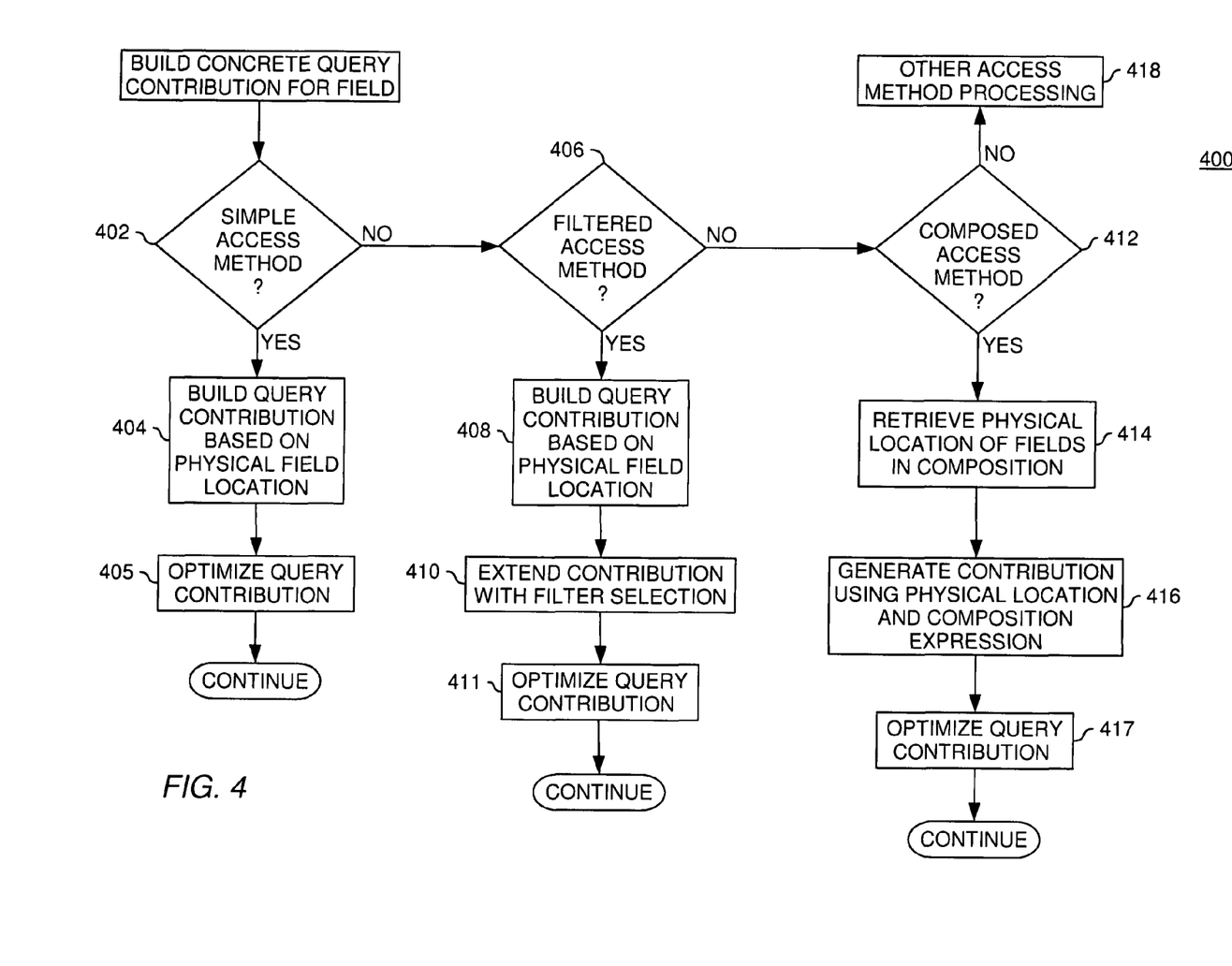
FIG. 4 is a flow chart illustrating the operation of a runtime component and an optimization component, according to one embodiment of the invention.

For example, the optimization metadata could specify an executable object method or an executable function of optimization component 155 to assist in building a query contribution (e.g., step 418 from FIG. 4). Alternatively, or in addition, the optimization metadata might specify a mapping table that indicates a mapping between a field in the query and some other item data. For example, in the telephone number illustration above, the mapping table would just have values like 608-WI or similar (lines 010-012). When the optimizer recognizes that a condition is a restriction on one of the composed fields, the mapping field can be used to add new conditions to limit the data selected for comparison for the target. For example, if there is an index over the state field (e.g., a primary key of a relational table), the runtime component 150 may generate a query contribution that searches the state criteria quickly to limit the number of rows included before performing full text search on to determine the phone number.

Furthermore, optimization metadata may be used in building conditions when the optimizer 155 recognizes that using one data type over another is more efficient. For example, the optimization component 155 may recognize that the area code is checked for a numeric value, and can easily build the condition to filter on the numeric field while still returning the proper output. This could be done using a more complex "like" clauses in an SQL query contribution, such as "608%", or by looking for area codes >=600 and less then <700 (lines 13-14). Further, in this example, optimizer 155 can recognize the "608%" value as a condition of the query results and build the optimized condition against the integer field which would be "and integerAreaCode=608".

Line 002 indicates that the "Full Phone Number" field uses a composed access method to retrieve a phone number from three columns of a demographics table in a data repository. Lines 003-007 indicate the proper composition (i.e., ######-

) formed using the concatenation of the three parts. Using the optimization data, the optimization component 155 may generate a number of efficient query contributions, depending on the underlying database schema. Continuing with the telephone number example, the runtime component 150 may generate the resolved query statement (e.g., as part of the operations illustrated in FIG. 3) in response to a query seeking a telephone number in the 608 area code (e.g., abstract query 802 illustrated in FIG. 8), as follows:

select table.pid, t1.ph_area||t1.ph_ex||t1.ph_num from demog where t1.ph_area||t1.ph_ex||t1.ph_num LIKE '608%'

Using this SQL query, the optimization component 155 may perform optimizations, not based on the optimization metadata, but rather on the initial query produced by the runtime component 150 and its understanding of the underlying data repository architecture. For example, given the above SQL query, the optimization component 155 may improve performance of query execution by not requiring all the concatenation operators before execution.

Several additional optimizations are possible using the optimization metadata included in Table III. Using such information, the optimization component 155 may capitalize on an area code having a fixed width of three characters and may further use optimization data to optimize the query based on a mapping between area codes and geographic locations. After these operations, the query is modified as follows:

select t1.pid, t1.ph_area||t1.ph_ex||t1.ph_num from Demog where t1state='WI' and t1.ph_area LIKE '608%'

Further, the optimization component 155 may optimize the query by not doing the LIKE operation at all, based on the same optimization metadata indicting a fixed field width of three characters, such as:

select t1.pid, t1.ph_area||t1.ph_ex||t1.ph_num from Demog where t1.state='WI' and t1.ph_area='608'

If the "WI" has an index over it, then the query optimizer may rearrange the query to create:

select t1.pid, t1.ph_area||t1.ph_ex||t1.ph_num from Demog where t1.state='WI' and t1.ph_area||t1.ph_ex||t1.ph_num='608'

Another possible optimization using the optimization metadata from this example includes using the type field which, in this example, is perhaps the fastest optimization. Other types of input data and underlying database architecture will cause different optimization techniques to be the most optimal. The "type" optimization uses a character version of the field for output, but uses an integer version for the internal comparison, creating the following optimized query from the original query set out above:

select t1.pid, t1.ph_area||t1.ph_ex t1.ph_num from Demog where t1.intAreaCode=608

Those skilled in the art will recognize, that the above examples, all related to optimizing a query used to retrieve a telephone number from multiple database columns, are illustrative only and that the types of data retrieved by a composed access method or the information included in the optimization metadata are not limited by the examples described above.

Hierarchical Field Types

Another query optimization technique involves logical fields composed according to some external hierarchy. These are an extremely common type of field that would be defined, for example, to create a data abstraction model of a medical records database. A hierarchical field type is basically a code/value type from a plurality of code/value types that are grouped into hierarchies for navigation and searching. For example, the International Classification of Diseases, 9th Revision (ICD-9) defines codes that form a common hierarchical structure using a 5 digit system. Using the ICD-9 hierarchy, a user may desire to query for a particular ICD code (e.g., ICD9code=123). The ICD-9 code "123" maps to "other cestode infection" and has sub-codes "123.0" through "123.9". Because these codes are commonly stored as character values, the SQL expression to find the ICD-9"123" codes would typically become "like 123%". This expression ("123%") will, however, typically perform slower because it interferes with the ability of the database optimizer to evaluate the selectivity of a "where" clause than a query that uses comparison values without any wildcard values (e.g., "where ICD9≥123 and ICD9≤124"). The optimization component 155 may be configured to modify query contribution generated from logical fields representing a hierarchical data type to remove such wildcard values and replace it with the range comparison listed above.

A further optimization based on hierarchal data types includes using the query optimizer 155 to build an SQL "in" condition containing exactly the values that are actually in the hierarchy. To use the above example, the in condition could be: "where ICD-9 in (123, 123.0. 123.1 . . . 123.9)". Such an optimization essentially expands the where clause to include all of the actual possibilities, preventing a query contribution from iterating through unused elements in the entire hierarchy.

Many other query optimization techniques may be employed by embedding information within the logical fields of an abstract database and data repository abstraction component. Those skilled in the art will, therefore, recognize that the optimization techniques described above are illustrative of techniques that may be used to optimize abstract queries, and not meant to be either an exhaustive or an exclusive description of abstract query optimization techniques.

While the foregoing is directed to embodiments of the present invention, other and further embodiments of the invention may be devised without departing from the basic scope thereof, and the scope thereof is determined by the claims that follow.

What is claimed is:

1. A method for accessing data in an environment having multiple data repositories, comprising:

providing a query specification defining a data abstraction model abstracting at least one relational database, wherein the query specification defines a plurality of logical fields used to compose an abstract query independently from a schema of the at least one relational database, wherein the definition for each logical field specifies at least an access method for accessing data in the at least one relational database, the access methods being selected from at least two different access method types, wherein at least a first logical field provides query optimization data for optimizing at least one of an abstract query composed using the logical fields of the data abstraction model and a corresponding resolved query generated from the abstract query, and wherein the query optimization data includes information related to a relationship between the first logical field and a second logical field included in the data abstraction model;

receiving, from a requesting entity, an abstract query composed from one or more of the logical fields, wherein the received abstract query includes the first logical field and the second logical field;

generating, from the received abstract query, a resolved query consistent with the schema of the at least one relational database to the access method defined for each logical field in the received abstract query; and optimizing the resolved query using the query optimization data provided for the first logical field and the second logical field;

executing the optimized query to retrieve a set of data from the at least one relational database consistent with the abstract query; and presenting the set of data to the requesting entity.

2. The method of claim 1, wherein the resolved query is an SQL query, and wherein the query optimization data is used to optimize the SQL query.

3. The method of claim 2, wherein the query optimization data includes row optimization data specifying a number of rows expected to be returned from executing the resolved query.

4. The method of claim 2, wherein the query optimization data is used to select between materializing a derived table in the SQL query generated from the abstract query and optimizing the SQL query to remove the derived table from the SQL query.

5. The method of claim 1, wherein the query optimization data includes information related to an underlying system used to store the data referenced by the first logical field, the information including at least one of product, version, release and service pack information of the at least one relational database.

6. The method of claim 1, wherein the optimization data in the first logical field references an external hierarchical data structure and the query optimization data includes information related to the hierarchical data structure.

7. The method of claim 1, wherein generating, from the received abstract query, the resolved query consistent with the schema of the at least one relational database of the data comprises generating, for each logical field in the abstract query, a query contribution according to the access method defined for each logical field, and optimizing the query contribution using the query optimization data provided for the first logical field.

8. The method of claim 7, wherein the resolved query is an SQL query and wherein the query optimization data is used to optimize the SQL query.

9. A computer-readable storage medium containing a program which, when executed by a processor, performs operations for providing access to data in an environment having multiple data repositories, comprising, providing a query specification defining a data abstraction model abstracting at least one relational database, wherein the query specification defines a plurality of logical fields used to compose an abstract query independently from a schema of the at least one relational database, wherein the definition for each logical field specifies at least an access method for accessing data in the at least one relational database, the access methods being selected from at least two different access method types, wherein at least a first logical field provides query optimization data for optimizing at least one of an abstract query composed using the logical fields defined in the query specification and a corresponding resolved query generated from the abstract query, and wherein the query optimization data includes information related to a relationship between the first logical field and a second logical field included in the data abstraction model;

receiving, from a requesting entity, an abstract query composed from one or more of the logical fields, wherein the received abstract query includes the first logical field and the second logical field;

generating, from the received abstract query, a resolved query consistent with the schema of the at least one relational database to the access method defined each logical field in the received abstract query; and optimizing the resolved query using the query optimization data provided for the first logical field and the second logical field;

executing the optimized query to retrieve a set of data from the at least one relational database consistent with the abstract query; and presenting the set of data to the requesting entity.

10. The computer-readable storage medium of claim 9, wherein the resolved query is an SQL query, and wherein the query optimization data is used to optimize the SQL query.

11. The computer-readable storage medium of claim 10, wherein the query optimization data includes row optimization data specifying a number of rows expected to be returned from executing the resolved query.

12. The computer-readable storage medium of claim 10, wherein the query optimization data is used to select between materializing a derived table in the SQL query generated from the abstract query and optimizing the SQL query to remove the derived table from the SQL query.

13. The computer-readable storage medium of claim 9, wherein the optimization data includes information related to an underlying system used to store the data referenced by the first logical field, the information including at least one of product, version, release and service pack information of the at least one relational database.

14. The computer-readable storage medium of claim 9, wherein the optimization data in the first logical field references an external hierarchical data structure and the optimization data includes information related to the hierarchical. data structure.

15. The computer-readable storage medium of claim 9, wherein generating, from the received abstract query, the resolved query consistent with the schema of the at least one relational database of the data comprises generating, for each logical field in the abstract query, a query contribution according to the access method defined for each logical field, and optimizing the query contribution using the query optimization data provided for the first logical field.

* * * * *